April 5, 1938.  F. VOSS  2,112,940
ATTACHMENT FOR BIRD CAGES
Filed July 13, 1936
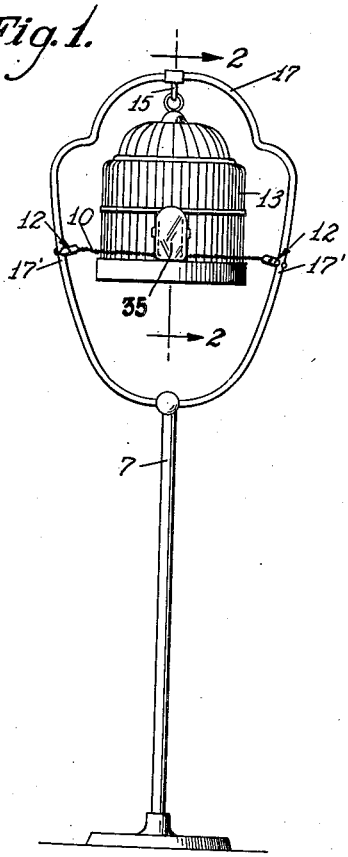
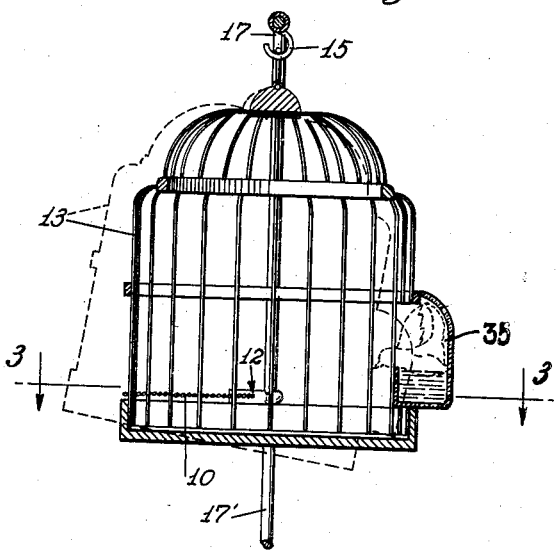
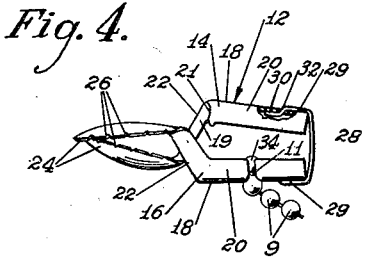
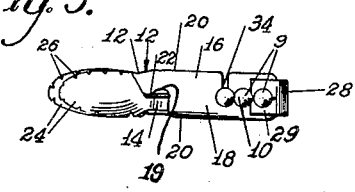
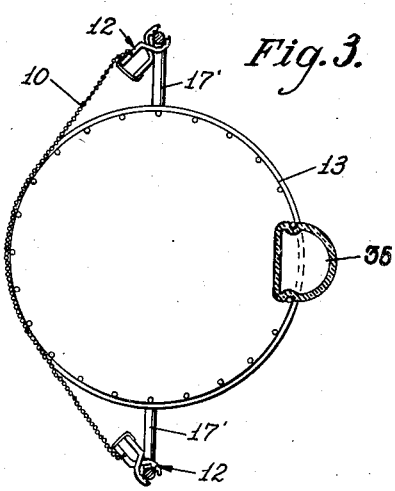
Frieda Voss
INVENTOR.
BY Clarence E. Threedy
HER ATTORNEY.

Patented Apr. 5, 1938

2,112,940

UNITED STATES PATENT OFFICE 2,112,940

ATTACHMENT FOR BIRD CAGES

Frieda Voss, Chicago, Ill.

Application July 13, 1936, Serial No. 90,269

4 Claims. (Cl. 119—17)

This invention relates to attachments for bird cages and the like, and has for a particular object a provision of detachable means for preventing the oscillation of the pendant type of cage by movement of the bird or other creature therein.

It has been found with bird cages pendantly supported for oscillatory movement, that it is at times desirable to prevent the movement of the cage as, for instance, when one of the several popular forms of bird bath attachment is applied to the cage, as hereinafter illustrated. Excessive oscillation or movement of the cage under such circumstances disturbs the contents of food and water containers therein, and unnecessarily broadens the range of water scattered from the fluttering of the bird in a bird bath attachment as illustrated, for example, at 35 in the drawing herewith, the added weight of a bird bath attachment and the water therein being frequently sufficient to unbalance the cage and cause it to assume an undesirable tilt from its normal and intended position with the attendant undesirable results suggested above.

In order to prevent the movement of the cage under such circumstances, or for other reasons, I have provided an improved attachment which is cheap to manufacture, readily applied to a variety of types of pendant cage, and which effectively prevents movement of the latter. The construction and operation of this attachment is particularly set forth in the following description in view of the drawing, in which:

Fig. 1 is a front elevation of one form of cage and support to which my invention may be applied;

Fig. 2 is a vertical section taken along the lines 2—2 of Fig. 1;

Fig. 3 is a horizontal section taken along the lines 3—3 of Fig. 2; while

Figs. 4 and 5 are respectively enlarged side and top details of the clasp portion of the attachment.

The improved attachment comprises a flexible link member 10 (Fig. 3), which may be a link ball type of chain or any suitable wear-resisting flexible substance, provided at its extremities with clasps 12, such as shown in Figs. 4 and 5.

Referring to Figs. 4 and 5, the clasps 12 comprise a pair of complementary claw members 14 and 16 in the form of substantially channeled body portions having a bottom wall 18 (Fig. 5) and opposite side walls 20. These channeled members each have a reduced portion 22 adjacent their free extremities, and this reduced portion 22 is offset as at 21 in Fig. 4, the latter terminating in a recessed claw portion 24 extended in a direction substantially parallel to the longitudinal axes of the channeled members of the main channel portions 14, 16 thereof. The claw portions 24 are provided with serrations 26 around the edge portions of the recesses, and are normally interfitted as in Fig. 4.

Each complementary pair of claw members 14, 16, as above described, is provided with a spring member 28 having portions 29 bent back substantially upon itself and having end portions 30 crimped for insertion in slots 32 in the bottom wall portions 18 of the channeled parts of the claw or clasp members, in a manner to hold the claw portions 24 in substantially confronting relation as shown in Fig. 4.

For this purpose, it will be observed that the reduced offset portions 22 extended from the channel portions of the claw or clasp body are designed to extend from one laterally narrow region adjacent the extremity of the main channeled body portion at the offset end thereof so as to provide a cut-away notch or inset 19 (Fig. 5), thereby permitting the claw members 14, 16 to be assembled in confronting relation for the free movement of the latter with respect to each other, the reduced portion 22 of one such member normally resting against or in the inset portion 19 of the other member of the pair.

Provided in the side wall 20 and bottom 18 of the main channel portion of each claw or clasp member is a slot 34 which is adapted to receive the narrow link portion 11 of a chain 10, which links together the individual balls 9 of the chain 10, and permits adjustment of the length of the chain. It will be observed, however, that other forms of chain than the preferred type shown might readily be used with the clasp arrangement just described, and for this purpose would require simply the provision in such a chain or link of enlarged end portions having an adjacent reduced portion insertable in the slot 34.

The use of my novel attachment may be illustrated with reference to Figs. 1 and 3, particularly, where the cage 13 is shown suspended from a hook 15 in the uppermost and arch portion 17 of a usual form of standard 7. The claw or clasp parts 12 at each of the extremities of the link or chain 10 are depressed against the normal tension of the yieldable links 28 therein to spread the gripping or claw portions 24 apart so that the latter may engage the said frame portions 17', respectively, of the standard 7, the body portion of the chain 10 being positioned thereby in the path of movement of the cage 13 and thus preventing any possibility of oscillation of the latter as illustrated in the dotted and full line position of the cage in Fig. 2.

The chain may conveniently be left connected to the frame or standard 7 by simply unclasping one of the two clasp members 12, thus conditioning the cage for free movement and at the same time leaving the chain in position for ready application.

It will also be noted that the attachment is not restricted to use with the type of standard shown in Fig. 1, for example, but the provision of a pair of clasps 12 makes it possible to attach one of the clasps to a portion of the cage and thereafter attach the other extremity of the chain to any suitable nearby object, such as the frame parts of other commonly used forms of standard, and in this respect the adjustable feature of the chain connection 11—20 provided in the clasps is additionally useful.

While I have described a particular structure to illustrate my invention, it will be apparent that modifications may readily be made in such structure and the disposition of parts without departing from the spirit of the invention, and I do not wish to be restricted to such detailed recitations except as I may be limited by the appended claims.

Having thus described my invention, what I claim as new and desire to protect by Letters Patent is:

1. The combination, with a pendantly movable bird cage and standard therefor, of oscillation preventing means comprising a chain having clasp members at its extremities detachably engaging the said standard to position the said chain in the path of movement of said cage.

2. The combination, with a pendantly supported bird cage or the like and a standard therefor having spaced upright cage supports, of movement preventing means comprising a ball chain having reduced ball-connecting links and clasps at the extremities of said chain and engageable therewith by slot portions in the said clasps adapted to engage the reduced link portions of said chain, each of said clasps being removably attached to one of said supports to dispose the chain across the path of swinging movement or pendant movement of said cage.

3. In combination, a standard, a cage suspended therefrom for oscillatory movement, and movement preventing means comprising a chain having a pair of clasps at its extremities and positionable in the path of movement of said cage by engagement of said clasps with said standard.

4. In combination, a standard, a cage supported therefrom for swinging movement, and movement preventing means comprising a ball type chain with reduced link portions, a pair of clasps including claw portions expansible for clasping engagement with said standard and each having an open slot for engagement with the reduced link portion of said chain whereby said chain may be positioned in the path of movement of said cage.

FRIEDA VOSS.